United States Patent
Errickson et al.

(10) Patent No.: US 9,571,572 B2
(45) Date of Patent: Feb. 14, 2017

(54) PEER-TO-PEER NETWORKING THROUGH UNIVERSAL PORT CONNECTIONS

(71) Applicant: International Buisness Machines Corporation, Armonk, NY (US)

(72) Inventors: Richard K. Errickson, Poughkeepsie, NY (US); Thomas A. Gregg, Highland, NY (US); Kulwant M. Pandey, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 412 days.

(21) Appl. No.: 14/266,863

(22) Filed: May 1, 2014

(65) Prior Publication Data
US 2015/0317273 A1 Nov. 5, 2015

(51) Int. Cl.
G06F 13/42 (2006.01)
G06F 15/173 (2006.01)
H04L 29/08 (2006.01)
G06F 15/17 (2006.01)
G06F 1/12 (2006.01)

(52) U.S. Cl.
CPC ............ *H04L 67/104* (2013.01); *G06F 1/12* (2013.01); *G06F 13/423* (2013.01); *G06F 13/4291* (2013.01); *G06F 15/17* (2013.01); *G06F 15/17325* (2013.01); *G06F 2213/0026* (2013.01)

(58) Field of Classification Search
CPC .................... G06F 15/17325; G06F 13/423
USPC ........ 709/204, 208, 219, 248; 725/114, 115, 725/116; 713/500
See application file for complete search history.

(56) References Cited

U.S. PATENT DOCUMENTS

| 5,537,574 A | 7/1996 | Elko et al. |
| 6,209,106 B1 | 3/2001 | Kubala et al. |
| 7,899,894 B2 | 3/2011 | Carlson et al. |
| 8,132,038 B2 | 3/2012 | Dahlen et al. |

(Continued)

FOREIGN PATENT DOCUMENTS

WO 2008025760 A1 3/2008

OTHER PUBLICATIONS

"Clock Synchronization for Wireless Sensor Networks: A Survey"—Buy et al, University of Illinois at Chicago, Mar. 2005 https://www.cs.uic.edu/~ajayk/ext/ClockSyncWSNsurvey.pdf.*

(Continued)

*Primary Examiner* — Randy Scott
(74) *Attorney, Agent, or Firm* — Cantor Colburn LLP

(57) ABSTRACT

Embodiments relate to two general purpose computers connected in a peer-to-peer mode by connecting a cable (or wireless connection) between universal ports (e.g., PCIe ports) on each computer. A timing protocol utility runs on each computer to time schedule operations performed by its respective computer. Because the system clocks on each peer computer operate independently (asynchronously), they may vary somewhat from each other. To support time synchronized peer-to-peer operations, paired clock value (one for each peer computer) are generated continually and independently by each peer system. Each peer system periodically supplies the paired clock values to its associated timing protocol utility, which uses the paired clock values to time synchronize peer-to-peer computer operations. The timing protocol utilities may also exchange the paired clock values with each other for integrity checking and other operations.

11 Claims, 4 Drawing Sheets

(56) References Cited

U.S. PATENT DOCUMENTS

| | | | |
|---|---|---|---|
| 8,467,688 | B2 | 6/2013 | Archambault et al. |
| 8,583,956 | B2* | 11/2013 | Fong ........................ A63H 3/28 |
| | | | 446/297 |
| 2009/0100197 | A1 | 4/2009 | Smith, Sr. |
| 2009/0276543 | A1* | 11/2009 | Turner ............... H04N 7/17318 |
| | | | 709/248 |
| 2013/0275444 | A1 | 10/2013 | Dow et al. |

OTHER PUBLICATIONS

List of IBM Patents or Patent Applications Treated as Related; (Appendix P), Filed May 24, 2016; 2 pages.
Richard K. Errickson, et al., "Peer-To-Peer Networking Through Universal Port Connections", U.S. Appl. No. 15/068,933, filed Mar. 14, 2016.
Dorsch, R., et al.; "IBM Parallel Sysplex Design for the IBM z196 System"; IBM J. Res. & Dev. vol. 56, No. 1/2; p. 9:1-9:11; Jan./Mar. 2012.

* cited by examiner

PEER-TO-PEER NETWORKING THROUGH UNIVERSAL PORT CONNECTIONS

BACKGROUND

The present invention relates generally to computer systems, and more specifically, to peer-to-peer networking through universal port connections.

Universal interface ports, such as PCIe ports, are included on general purpose computers to allow the computers to connect to a wide range of external devices, such as local area networks, storage area networks, printers, scanners, graphics controllers, game systems, and so forth. Universal ports generally allow a wide range of different types of external devices to connect to the computer over the same universal port. While universal ports have become popular, peer-to-peer networking is not presently available through the universal ports.

SUMMARY

Embodiments include a method, system, and computer program product for peer-to-peer networking through universal port connections. A responding computer is configured for a peer-to-peer network configuration with an initiating computer that includes a first central processing unit (CPU), a first system clock, a first timing protocol utility configured utilize the first system clock to schedule computer operations performed by the first CPU, and a first universal port. The responding computer includes a second central processing unit (CPU), a second system clock, a second timing protocol utility configured utilize the second system clock to scheduling computer operations performed by the second CPU, and a second universal port. The responding computer is configured for functional connection in the peer-to-peer network configuration through the first and second universal ports.

The second clock synchronizer running on the responding computer generates a second clock marker based on the second system clock in response to receipt of a first system clock marker based on the first system clock received from the initiating computer. The first and second system clock markers form a first version of paired clock values, which the responding computer provides to the second timing protocol utility. The second timing protocol utility utilizes the first version of paired clock values to synchronize peer-to-peer computer operations performed by the second CPU.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
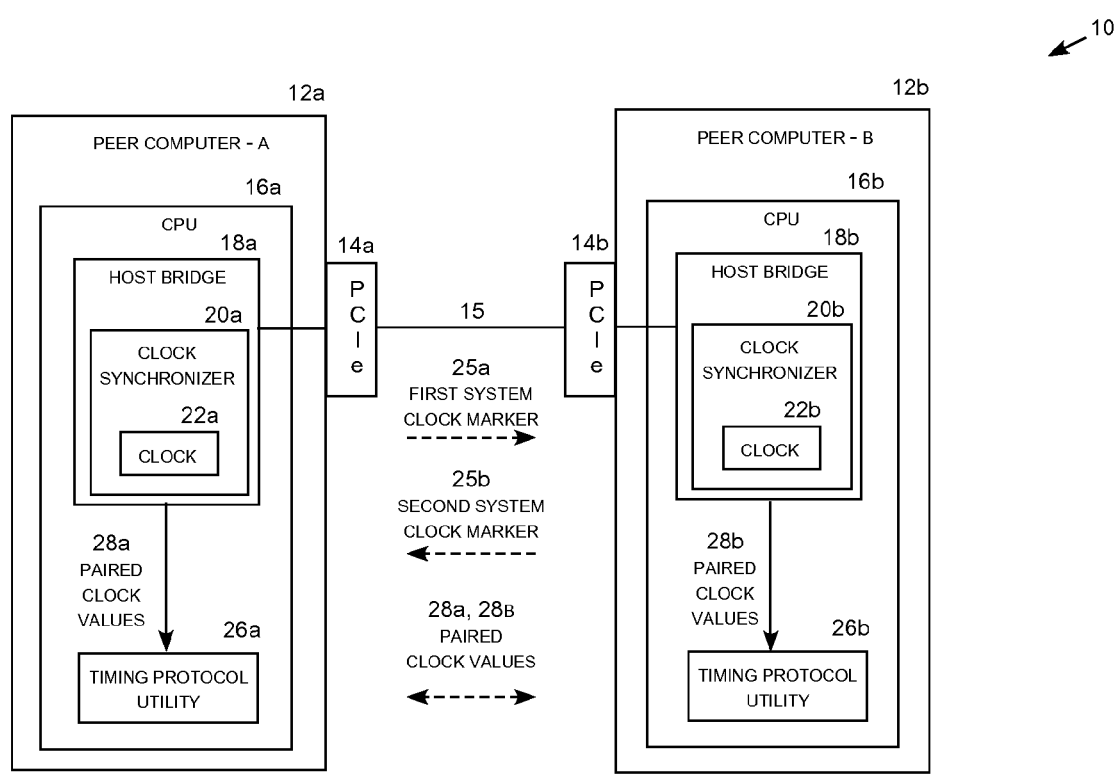
FIG. 1 depicts two computer systems connected in a peer-to-peer networking configuration through a connection between their respective universal ports in accordance with an embodiment.

Embodiments include computers with universal ports connected to each other to connect the computers in a peer-to-peer networking configuration. Universal interface ports are included on general purpose computers to allow the computers to connect to a wide range of external devices, such as a local area networks, storage area networks, printers, scanners, graphics controllers, game systems, and so forth. Universal ports generally allow a wide range of different types of external devices to connect to the computer over the same universal port. PCIe is a modern universal port protocol for parallel ports that allows peripherals utilizing different operating modes to connect to a standard PCIe parallel port. While embodiments pertain to universal ports generally, specific embodiments utilizing the PCIe standard are described below as the illustrative embodiments.

The present disclosure enables the universal ports on two computers to be connected to each other to connect the computers in a peer-to-peer networking configuration. A timing protocol utility runs on each computer to time schedule operations performed by its respective computer. Because the system clocks on each peer computer operate independently (asynchronously), they may vary somewhat from each other. To support time synchronized peer-to-peer operations, paired clock value (one for each peer computer) are continually generated by each peer system. Each peer system periodically supplies the paired clock values to its associated timing protocol utility, which uses the paired clock values to time synchronize peer-to-peer computer operations. The timing protocol utilities may also exchange the paired clock values with each other for integrity checking and other operations. In this context, it should be noted that the term "synchronize" means to "adjust for system clock differences" between the first and second system clocks and does not require that any particular operations be performed simultaneously.

In a particular embodiment, a first peer computer (also referred to as the initiating computer) periodically generates a time-of-day (TOD) marker from its own system clock (i.e., a first TOD clock value based on the first system clock on the first computer reflecting a remote transmit time), which the first peer computer transmits to the second peer counterpart (also referred to as the responding computer) in a time synchronization message. Receipt of the time synchronization message triggers the second peer counterpart to generate its own system clock marker (i.e., a second TOD clock value based on the second system clock on the second computer reflecting a local reception time). The paired clock values reflect the remote transmit time and the local reception time of the same time synchronization communication. The second peer computer then provides the paired clock values to its respective timing protocol utility, which uses the paired clock values for synchronizing peer-to-peer computer operations.

A second version of the paired clock values is similarly initiated by the second computer independently of the first version of pair clock values initiate by the first computer. The timing protocol utilities may also exchange the paired clock values with each other for integrity checking and other operations, so that each timing protocol utility may have both versions of the paired clock values available for synchronizing peer-to-peer computer operations. The procedure may be repeated continually to account for clock drift, resets, and any other changes in relative clock timing that may occur.

Turning now to FIG. 1, a peer-to-peer computer networking configuration 10 includes a first general purpose computer 12a (first peer computer, also referred to as the initiating computer) and a second general purpose peer computer 12b (second peer computer, also referred to as the responding computer). The first computer 12a includes a PCIe port 14a (universal port) and a central processing unit (CPU) 16a that includes a host bridge 18a realized through dedicated hardware and associated firmware as an on-chip subsystem of the CPU. The host bridge 18a, in turn, includes a clock synchronizer 20a and an internal system clock 22a. The first computer 12a also includes a timing protocol utility 26a, which may also be realized as an on-chip subsystem of the CPU 16a. Generally described, the timing protocol utility is a general purpose event scheduler that synchronizes operations of the CPU 16a.

Although each peer computer need not be identical, their clock operations may be considered analogous for the purpose of the present disclosure. For illustration purposes, the second computer also includes a central processing unit (CPU) 16b that includes a host bridge 18b realized through dedicated hardware and associated firmware as an on-chip subsystem of the CPU. The host bridge 18b, in turn, includes a clock synchronizer 20b and an internal system clock 22b. The first computer 12b also includes its own timing protocol utility 26b, which may also be realized as an on-chip subsystem of the CPU 16a. The second computer 12b also includes a PCIe port 14b (universal port). Peer-to-peer networking occurs over a functional connection 15 (e.g., a PCIe cable or wireless connection) connected between the first PCIe port 14a on the first peer computer 12a and the second PCIe port 14b on the second peer computer 12b.

Figure 2:
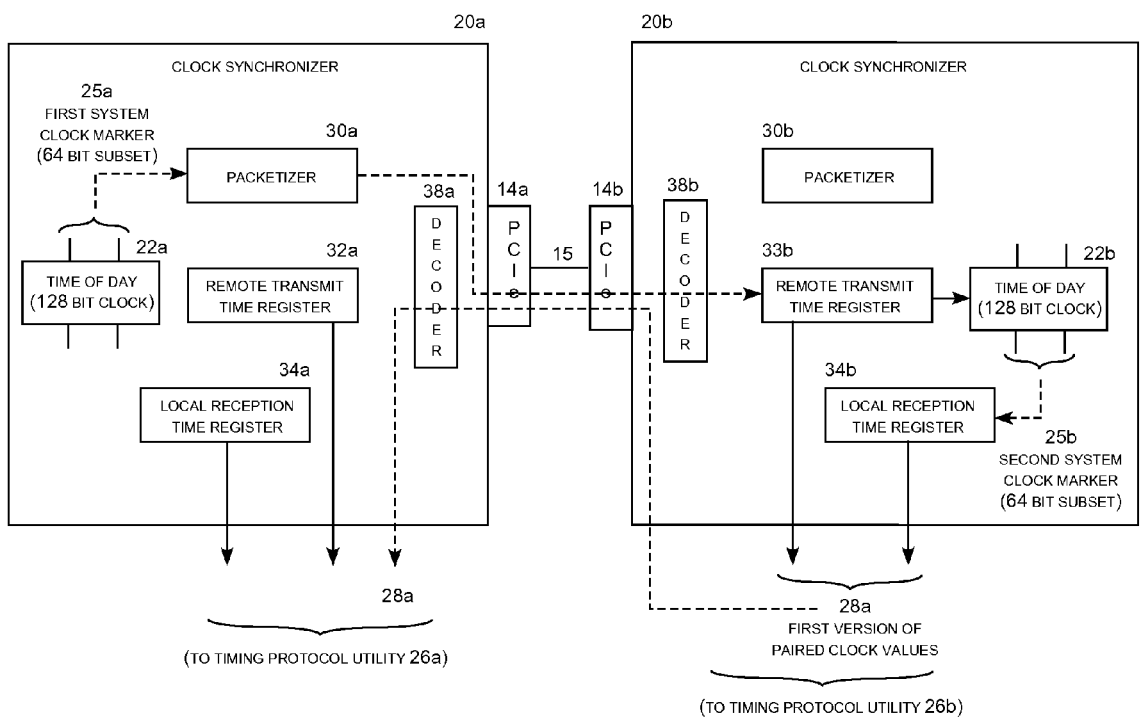
FIG. 2 depicts a conceptual illustration of time synchronization communications including a first version of paired clock values in accordance with an embodiment.
Figure 3:
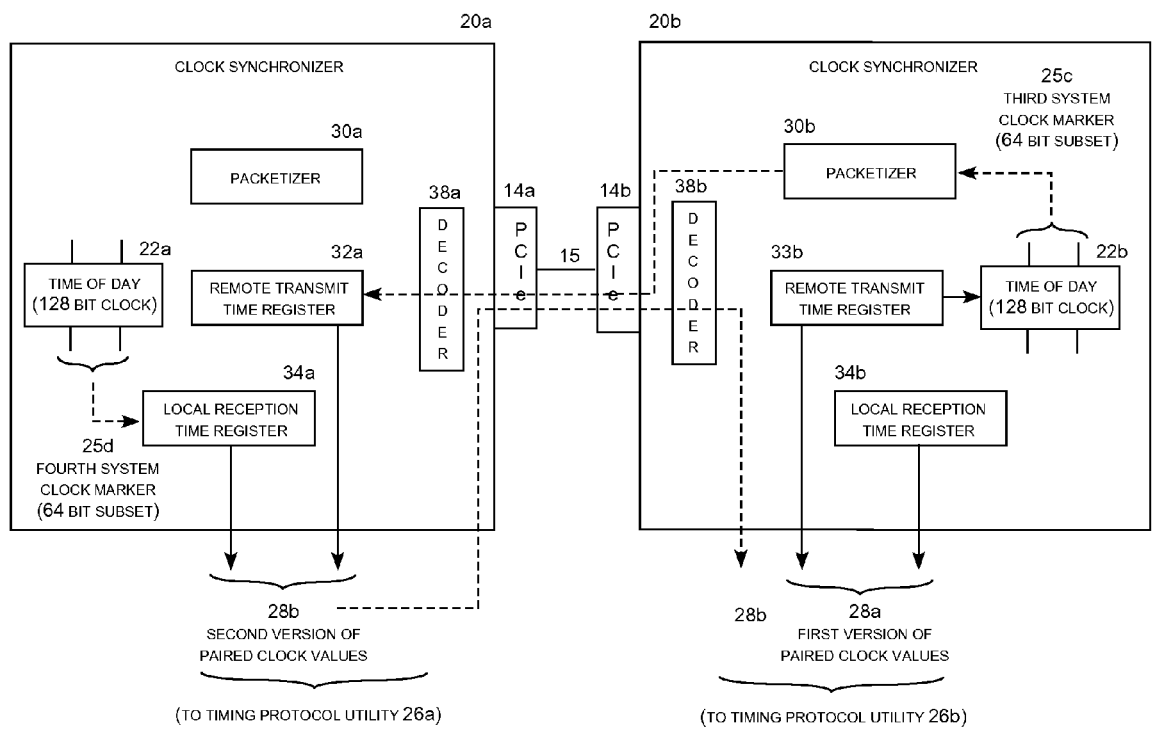
FIG. 3 depicts a conceptual illustration of time synchronization communications including a second version of paired clock values in accordance with an embodiment.

While the clock synchronizers 20a and 20b are generally indifferent to the specific timing operations performed by their respective timing protocol utilities 26a and 26b, they are tasked with periodically providing their respective timing protocol utilities with paired clock values representing the remote transmit time and the local reception time of time synchronization messages exchanged between the peer computers 12a and 12b. FIG. 2 depicts a conceptual illustration of the time synchronization communications for a first version of paired clock values 28a while FIG. 3 shows the time synchronization communications for a second version of paired clock values 28b in the peer-to-peer configuration 10. The first version of paired clock values 28a is initiated by the first computer 12a and completed by the second computer 12b, whereas the second version of paired clock values 28b is initiated by the second computer and completed by the first computer. As shown in FIGS. 2 and 3, the timing protocol utilities 26a and 26b may also exchange the paired clock values with each other for integrity checking and other operations, so that each timing protocol utility may have both versions of the paired clock values 28a and 28b available for synchronizing peer-to-peer computer operations.

The first clock synchronizer 20a on the first peer computer 12a includes a first time-of-day clock 22a (in this embodiment a 128 bit clock), a packetizer 30a (packet formation firmware), a first remote transmit time register 32a, a first local reception time register 34a, and a first packet decoder 38a. Similarly, the second clock synchronizer 20b on the second peer computer 12b includes a second time-of-day clock 22b, a second time synchronization packetizer 30b, a second remote transmit time register 32b, a second local reception time register 34b, and a second packet decoder 38b.

As shown in FIG. 2, the first version of the paired clock values 28a (initiated by the first computer 12a) includes a first system clock marker 25a reflecting the remote transmit time determined by the first system clock 22a and a second system clock 25b marker triggered by receipt of the first system clock marker reflecting the local reception time determined by the second system clock 22b. The timing protocol utility 26b running on the second computer 12b may also transmit the first version of paired clock value 28a to the timing protocol utility 26a running on the first computer 12a for integrity checking and other operations.

Similarly, as shown in FIG. 3, the second version of the paired clock values 28b (initiated by the second computer 12b) includes a third system clock marker 25c reflecting a remote transmit time determined by the second system clock 22b and a fourth system clock marker 25d triggered by receipt of the third system clock marker reflecting a local reception time determined by the first system clock 22a. The timing protocol utility 26a running on the first computer 12a may also transmit the second version of paired clock value 28b to the timing protocol utility 26b running on the second computer 12b for integrity checking and other operations.

Figure 4:
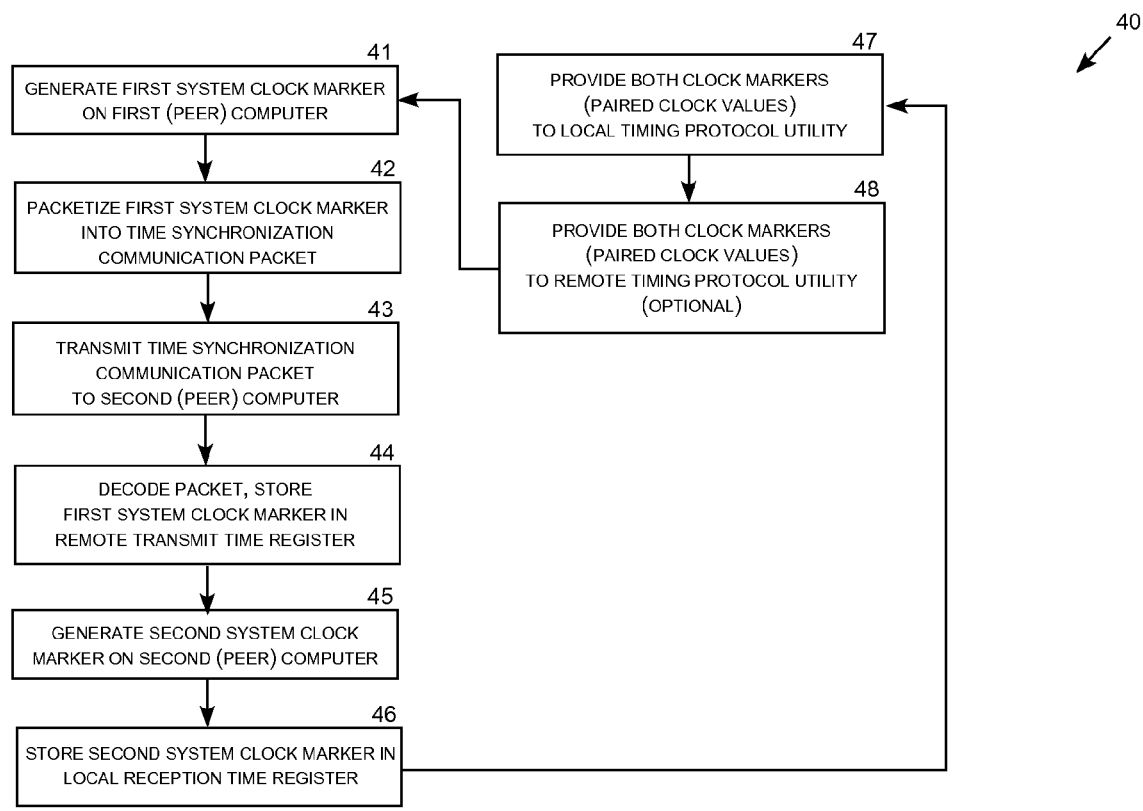
FIG. 4 depicts a process flow for producing the time synchronization communications in accordance with an embodiment.

FIG. 4 depicts a process flow 40 for producing the time synchronization communications in the peer-to-peer configuration. Since each clock synchronizer continually performs the same time synchronization procedure independently (asynchronously), only the procedure initiated by the first peer computer 12a producing the first version of paired clock values 28a diagramed on FIG. 2 is described below with further reference to the logic flow diagram of FIG. 4. It will be understood, however, that the second peer computer 12b performs a similar operation to produce the second version of paired clock values 28b so that each peer's respective timing protocol utility creates and stores its own version of paired clock values. While two versions of the paired clock values are utilized in this particular embodiment, alternative embodiments may utilize a single set of paired clock values continually exchanged between the peer computers as a matter of design choice.

In block 41, the first clock synchronizer 20a generates a first system clock marker 25a, which in this embodiment is a 32-bit subset of the time-of-day clock 22a on the first peer computer 12a, in which the low-order bit represents a resolution of 62.5 nanoseconds. In block 42, the first packetizer 30a encodes the first system clock marker 25ar into a time synchronization communication packet using a suitable packet protocol indicating that the clock synchronizer 20b is the designated recipient of the packet. In block 43, the first packetizer 30a transmits the time synchronization communication packet containing the first system clock marker 25a to the second peer computer 12b over the functional connection 15.

In block 44, the second clock synchronizer 20b receives the time synchronization communication packet, the decoder 38b obtains the first system clock marker 25a from the packet, and stores the first system clock marker in the remote transmit time register 33b. In block 45, receipt of the first system clock marker 25a triggers the second clock synchronizer 20b to generate a second system clock marker 25b, which in this embodiment is a 32-bit subset of the time-of-day clock 22b on the second peer computer 12b, in which the low-order bit represents a resolution of 62.5 nanoseconds. In block 46, the second clock synchronizer 20*b* stores the second system clock marker 25*b* in the local reception time register 34*b*. In block 47, the second clock synchronizer 20*b* provides the paired clock values 28*b* (i.e., the first system clock marker in the remote transmit time register 33*b* and the second system clock marker in the local reception time register 34*b*) to its respective (local) timing protocol utility 26*b*. The clock synchronizer 20*b* may also read the remote transmit time register 33*b* twice, once before reading the local reception time register 34*b* and again after reading local reception time register, and compare the two readings to validate the first time marker (e.g., to ensure that a new synchronization message has not arrived during clock value processing). In addition, in block 48, the local timing protocol utility 26*b* may also send its version of the paired clock values 28*b* to the remote timing protocol utility 26*a* via the functional connection 15. Routine 40 periodically repeats independently (asynchronously) of a similar procedure initiated by the second clock synchronizer 20*b*.

Technical effects and benefits include the ability to utilize universal PCIe ports to connect two general purpose computers in a peer-to-peer mode. Each computer continually and independently (asynchronously) generates a time marker and transmits it to the other peer computer in a time synchronization communication, which triggers the other peer computer to generate and provide paired clock values to its respective timing protocol utility. Even though the system clock on each peer computer operates independently and each peer computer initiates time synchronization communications independently, periodic generation of paired clock values allows the timing protocol utilities running on both peer computers to maintain continually updated paired clock values for synchronizing peer-to-peer computer operations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
a responding computer utilizing a peer-to-peer network configuration with an initiating computer having a first central processing unit (CPU), a first system clock, a first timing protocol utility, and a first universal port, wherein the first timing protocol utility utilizes the first system clock to schedule computer operations performed by the first CPU;
the responding computer comprising a second central processing unit (CPU), a second system clock, a second timing protocol utility, and a second universal port~wherein the second timing protocol utility utilizes the second system clock to schedule computer operations performed by the second CPU;
wherein the responding computer includes a functional connection in the peer-to-peer network configuration through the first and second universal ports;
wherein the second clock synchronizer running on the responding computer generates a second clock marker based on the second system clock in response to receipt of a first system clock marker based on the first system clock received from the initiating computer;
wherein the first and second system clock markers form a first version of paired clock values, which the responding computer provides to the second timing protocol utility;
wherein the second timing protocol utility utilizes the first version of paired clock values to synchronize peer-to-peer computer operations performed by the second CPU;
wherein the second clock synchronizer generates a third clock marker reflecting a time of day based on the second system clock and to transmit the third system clock marker to the first computer over the functional connection between the first and second universal ports;
wherein the first clock synchronizer running generates a fourth clock marker based on the first system clock in response to receipt of the third system clock marker, the third and fourth system clock markers comprising a second version of paired clock values, and to provide the second version of paired clock values to the first timing protocol utility;
wherein the first timing protocol utility utilizes the second version of paired clock values to synchronize peer-to-peer computer operations performed by the first CPU;
wherein the responding computer transmits the first version of paired clock values to the initiating computer;
wherein the first timing protocol utility utilizes the first and second versions of paired clock values to synchronize the peer-to-peer computer operations performed by the first CPU;

wherein the initiating computer transmits the second version of paired clock values to the responding computer; and the second timing protocol utility utilizes the first and second versions of paired clock values to synchronize the peer-to-peer computer operations performed by the second CPU.

2. The computer system of claim 1, wherein the first system clock marker comprises a subset of a time of day representation generated by the first system clock.

3. The computer system of claim 2, wherein the second system clock marker comprises a subset of a time of day representation generated by the second system clock.

4. The computer system of claim 1, wherein:
the responding computer further comprises a remote transmit time register for storing the first system clock marker and a local reception time register for storing the second system clock marker; and
the initiating computer further comprises a remote transmit time register for storing the third system clock marker and a local reception time register for storing the fourth system clock marker.

5. The computer system of claim 1, wherein the initiating and responding computers are further configured to continually generate the first and second versions of the paired system clocks.

6. A computer implemented method for peer-to-peer networking through universal port connections, comprising:
receiving a first clock marker reflecting a time of day based on a first system clock of a first computer comprising a first central processing unit (CPU), the first system clock, a first timing protocol utility, and a first universal port, wherein the first timing protocol utility utilizes the first system clock to schedule computer operations performed by the first CPU;
the first system clock marker received over a functional connection between the first universal port and a second universal port of a second computer comprising a second central processing unit (CPU), a second system clock, a second timing protocol utility, and the second universal port, wherein the second timing protocol utilizes the second system clock to schedule computer operations by the second CPU;
generating a second clock marker based on the second system clock in response to receipt of the first system clock marker, the first and second system clock markers comprising a first version of paired clock values;
providing the first version of paired clock values to the second timing protocol utility for synchronizing peer-to-peer computer operations performed by the second CPU;
generating a third clock marker reflecting a time of day based on the second system clock;
transmitting the third system clock marker to the first computer over the functional connection between the first and second universal ports;
generating a fourth clock marker based on the first system clock in response to receipt of the third system clock marker, the third and fourth system clock markers comprising a second version of paired clock values, and to provide the second version of paired clock values to the first timing protocol utility;
providing the second version of paired clock values to the first timing protocol utility for synchronizing peer-to-peer computer operations performed by the first CPU;
transmitting the first version of paired clock values from the second computer to the first computer;

utilizing the first and second versions of paired clock values to synchronize the peer-to-peer computer operations performed by the first CPU;
transmitting the second version of paired clock values from the first computer to the second computer; and
utilizing the first and second versions of paired clock values to synchronize the peer-to-peer computer operations performed by the second CPU.

7. The method of claim 6, further comprising utilizing a subset of a time of day representation generated by the first system clock as the first system clock marker.

8. The method of claim 7, further comprising utilizing a subset of a time of day representation generated by the second system clock as the second system clock marker.

9. The method of claim 6, further comprising:
storing the first clock marker in a remote transmit time register of the second computer;
storing the second system clock marker in a local reception time register of the second computer;
storing the third clock marker in a remote transmit time register of the first computer;
storing the fourth system clock marker in a local reception time register of the first computer.

10. The method of claim 6, further comprising continually generating the first and second versions of the paired system clocks.

11. A computer program product for implementing peer-to-peer networking through universal port connections, the computer program product comprising:
a non-transitory computer readable storage medium having program instructions embodied therewith, the program instructions readable by a processing circuit to cause the processing circuit to perform a method comprising:
receiving a first clock marker reflecting a time of day based on a first system clock of a first computer comprising a first central processing unit (CPU), the first system clock, a first timing protocol utility, and a first universal pork wherein the first timing protocol utility utilizes the first system clock to schedule computer operations performed by the first CPU;
the first system clock marker received over a functional connection between the first universal port and a second universal port of a second computer comprising a second central processing unit (CPU), a second system clock, a second timing protocol utility, and the second universal port, wherein the second timing protocol utility utilizes the second system clock to schedule computer operations performed by the second CPU,
generating a second clock marker based on the second system clock in response to receipt of the first system clock marker, the first and second system clock markers comprising a first version of paired clock values;
providing the first version of paired clock values to the second timing protocol utility for synchronizing peer-to-peer computer operations performed by the second CPU;
generating a third clock marker reflecting a time of day based on the second system clock:
transmitting the third system clock marker to the first computer over the functional connection between the first and second universal ports;
generating a fourth clock marker based on the first system clock in response to receipt of the third system clock marker, the third and fourth system clock markers comprising a second version of paired clock values, and to provide the second version of paired clock values to the first timing protocol utility;
providing the second version of paired clock values to the first timing protocol utility for synchronizing peer-to-peer computer operations performed by the first CPU;
transmitting the first version of paired clock values from the second computer to the first computer;
utilizing the first and second versions of paired clock values to synchronize the peer-to-peer computer operations performed by the first CPU;
transmitting the second version of paired clock values from the first computer to the second computer; and
utilizing the first and second versions of paired clock values to synchronize the peer-to-peer computer operations performed by the second CPU.

* * * * *